(12) United States Patent
Chou et al.

(10) Patent No.: US 7,616,693 B2
(45) Date of Patent: Nov. 10, 2009

(54) METHOD AND SYSTEM FOR DETECTING MOTION BETWEEN VIDEO FIELD OF SAME AND OPPOSITE PARITY FROM AN INTERLACED VIDEO SOURCE

(75) Inventors: Chih-Hsien Chou, San Jose, CA (US); Chang-Hau Lee, Fremont, CA (US)

(73) Assignee: Kolorific, Inc., Milpitas, CA (US)

( * ) Notice: Subject to any disclaimer, the term of this patent is extended or adjusted under 35 U.S.C. 154(b) by 1149 days.

(21) Appl. No.: 11/001,826

(22) Filed: Dec. 2, 2004

(65) Prior Publication Data

US 2006/0164559 A1 Jul. 27, 2006

(51) Int. Cl.
*H04N 7/12* (2006.01)
(52) U.S. Cl. ............................................. 375/240.26
(58) Field of Classification Search ............ 375/240.01, 375/240.16, 240.26; 348/452; *H04N 7/12*
See application file for complete search history.

(56) References Cited

U.S. PATENT DOCUMENTS 5,689,301 A * 11/1997 Christopher et al. ........ 348/452

\* cited by examiner

*Primary Examiner*—Young Lee

(57) ABSTRACT

A method and system for detecting the motion between a video field and its previous and subsequent video fields at a specified position. The motion detection scheme and system allows signal values of one set of vertically adjacent pixels from a video field of one parity and two other sets of vertically adjacent pixels from two neighboring video field of opposite parity to be measured such that when taken together, these pixels represent relevant sample of an image near the vertically and temporal position of the video field. The motion detection scheme also allows the calculation of three motion values between the video field and its previous video field, the video field and its subsequent video field and the previous and subsequent fields of the same video field. The overall level of motion at the field being measured is determined by combining the information from the three motion values calculated at the specified spatial and temporal location.

15 Claims, 22 Drawing Sheets

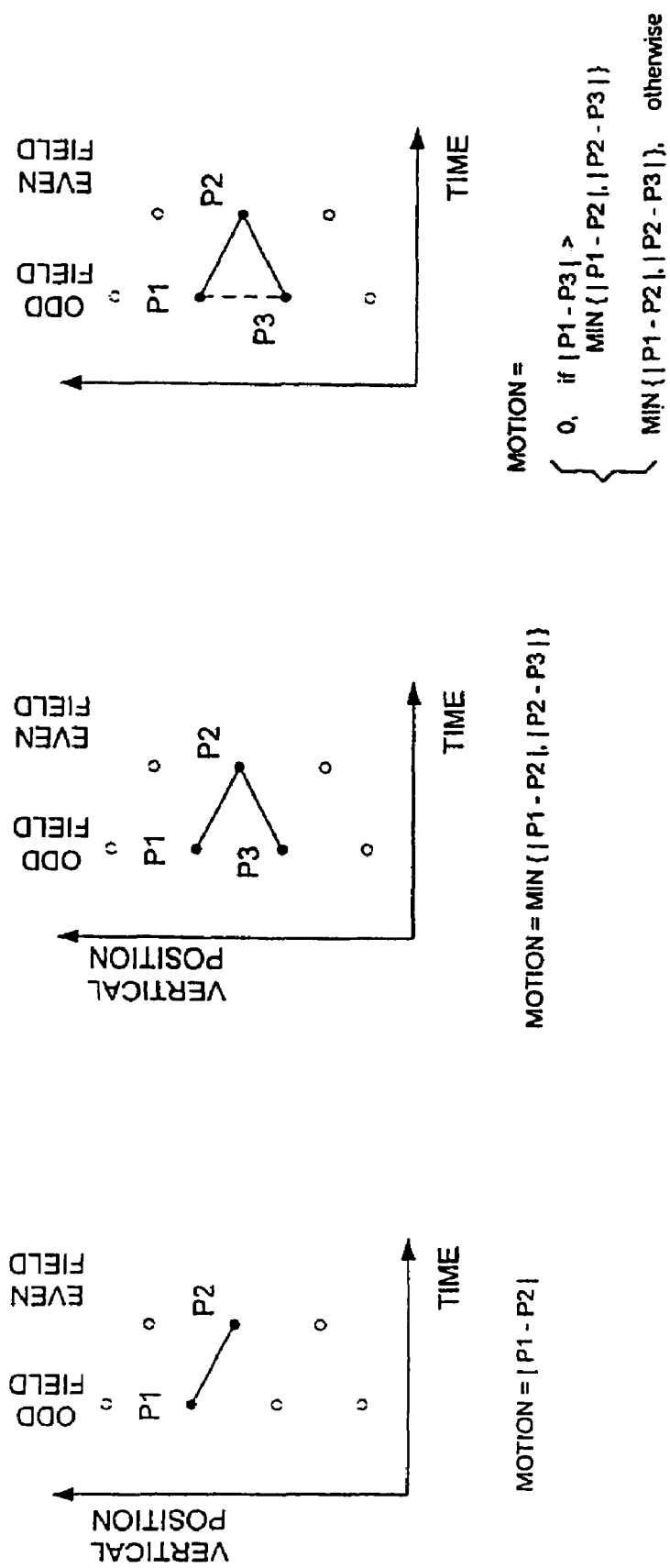

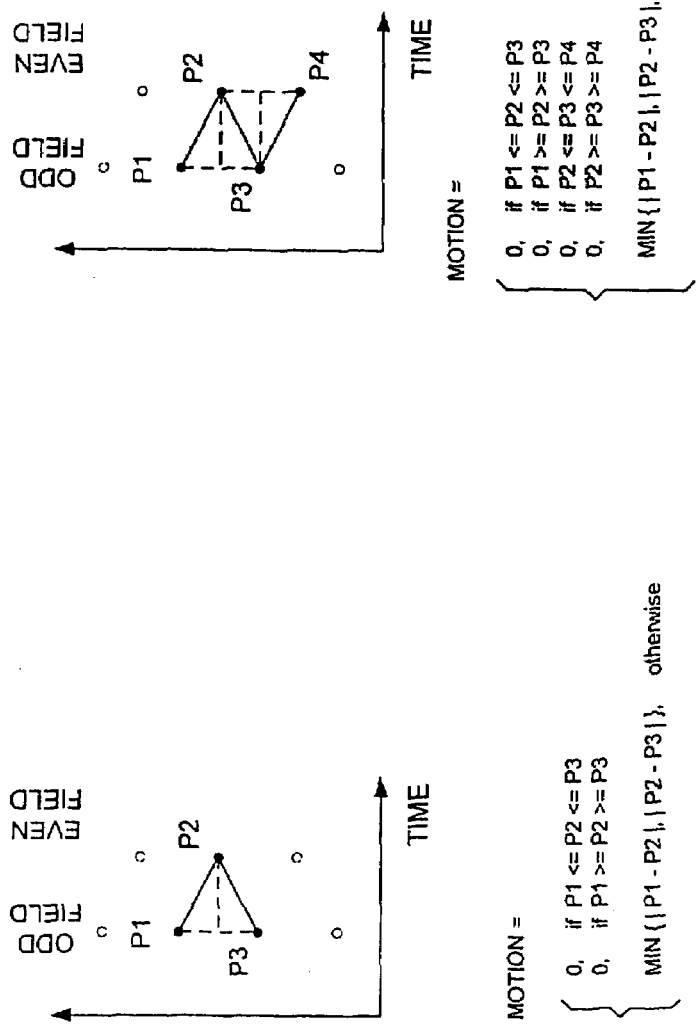

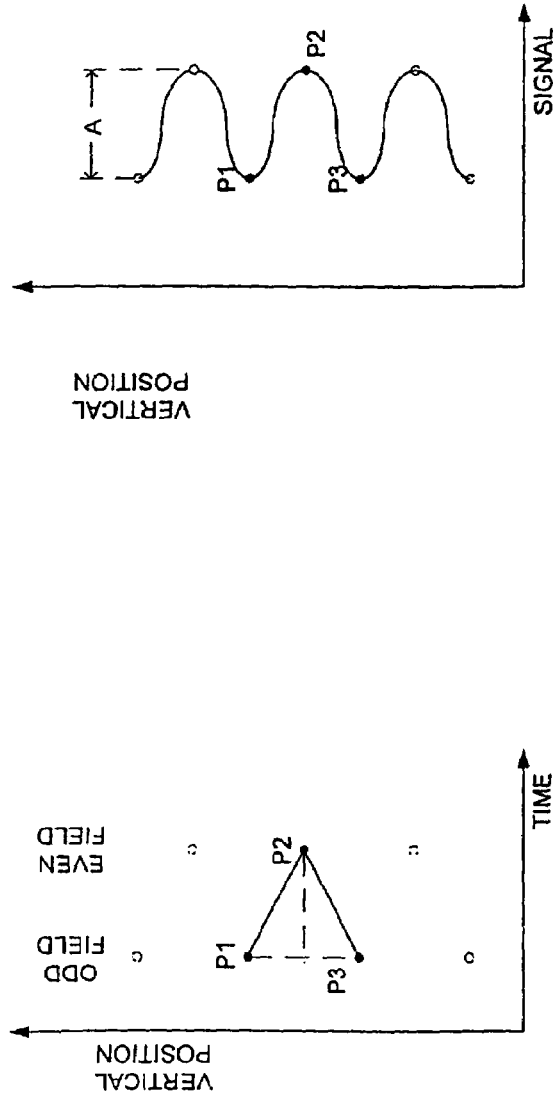

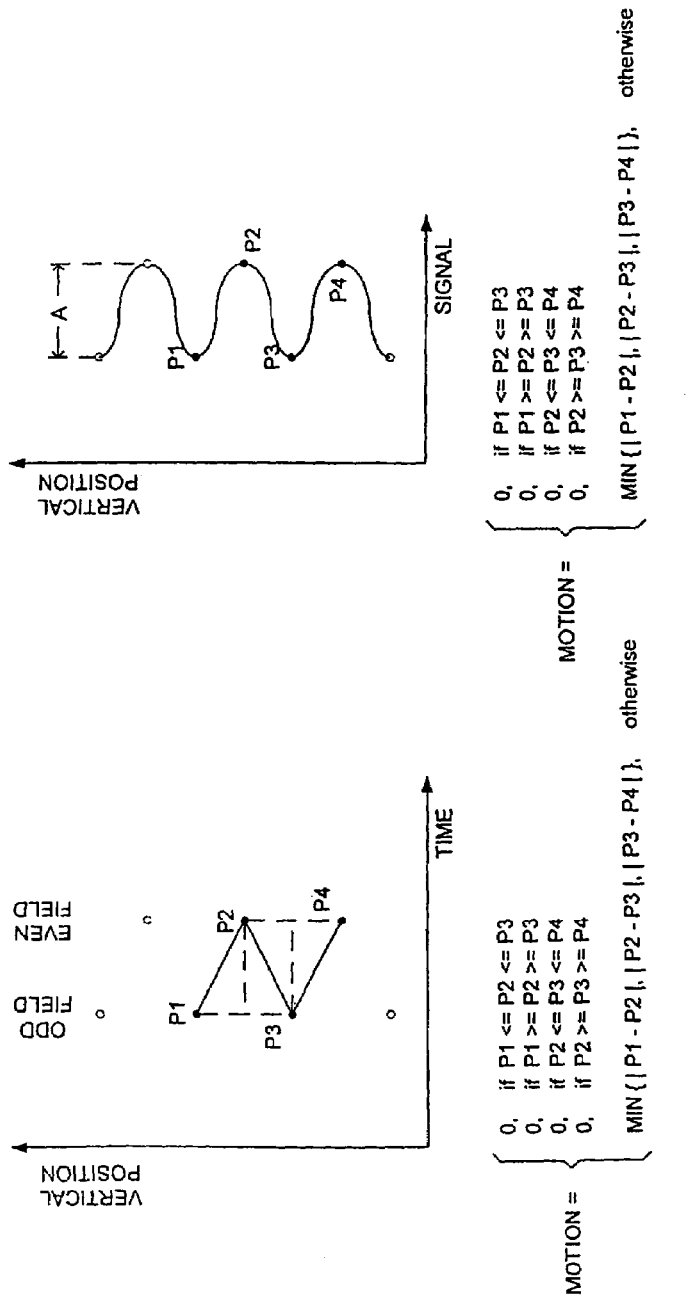

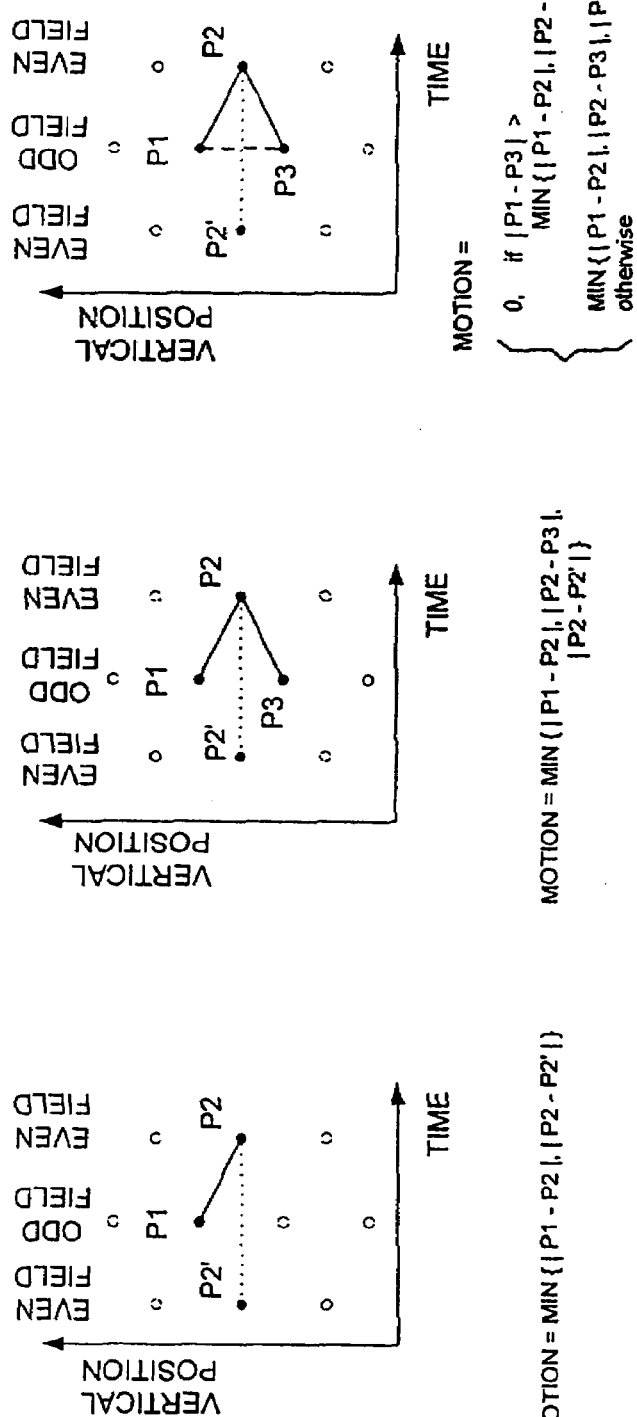

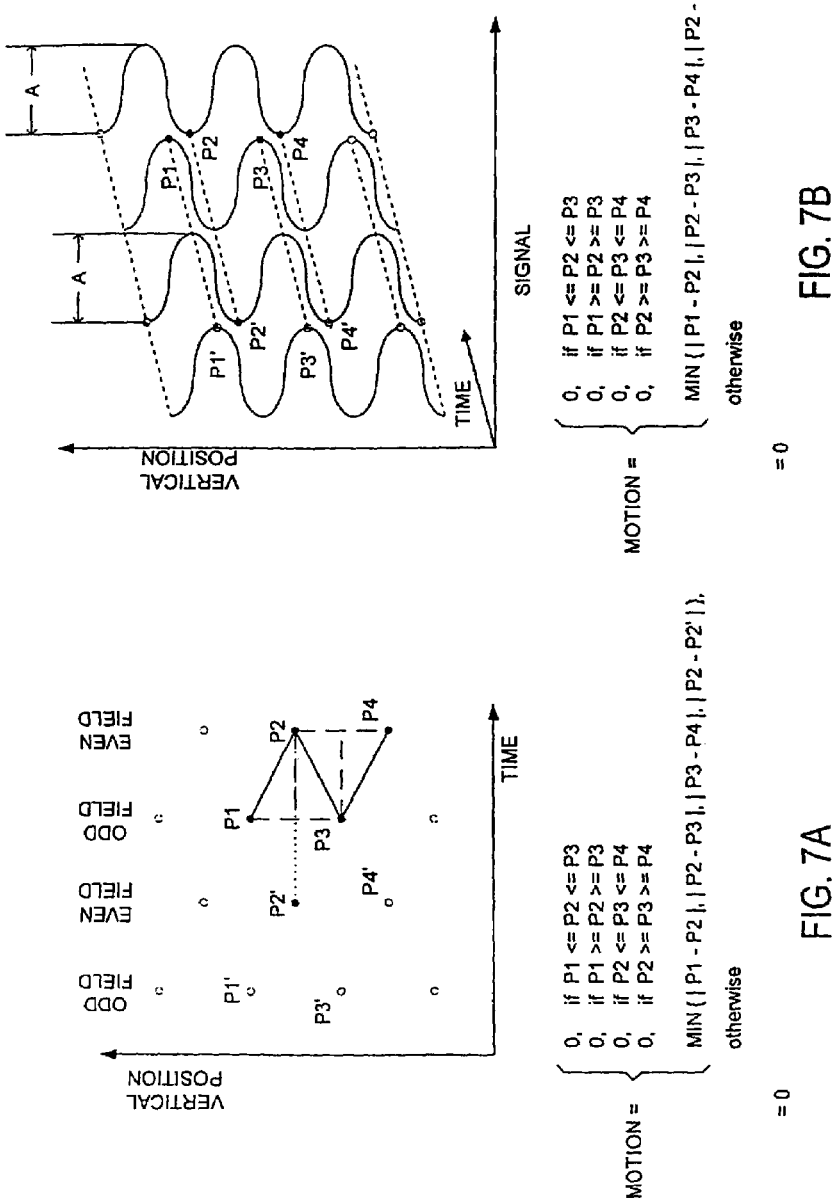

METHOD AND SYSTEM FOR DETECTING MOTION BETWEEN VIDEO FIELD OF SAME AND OPPOSITE PARITY FROM AN INTERLACED VIDEO SOURCE

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The invention pertains to image analysis, more specifically to a mechanism of processing interlaced video signal whereby motion between successive fields of the same or opposite parity are detected.

2. Description of Related Art

The NTSC and PAL video standards are in widespread use throughout the world today. Both of these standards make use of interlacing video signals in order to maximize the vertical refresh rate thereby reducing wide area flicker, while minimizing the bandwidth required for transmission. With an interlaced video format, half of the lines that make up a picture are displayed during one vertical period (i.e. the even field), while the other half are displayed during the next vertical period (i.e. the odd field) and are positioned halfway between the lines displayed during the first period. While this technique has the benefits described above, the use of interlacing can also lead to the appearance of artifacts such as line flicker and visible line structure.

It is well known in the prior art that the appearance of an interlaced image can be improved by converting it to non-interlaced (progressive) format and displaying it as such. Moreover, many newer display technologies, for example Liquid Crystal Displays (LCDs) are non-interlaced by nature, therefore conversion is necessary before an image can be displayed at all.

Numerous methods have been proposed for converting an interlaced video signal to progressive format. For example, linear methods have been used, where pixels in the progressive output image are generated as a linear combination of spatially and/or temporally neighboring pixels from the interlaced input sequence. Although this approach may produce acceptable results under certain conditions, the performance generally represents a trade off between vertical spatial resolution and motion artifacts. Instead of accepting a compromise, it is possible to optimize performance by employing a method that is capable of adapting to the type of source material. For instance, it is well known that conversion from interlaced to progressive format can be accomplished with high quality for sources that originate from motion picture film or from computer graphics (CG). Such sources are inherently progressive in nature, but are transmitted in interlaced format in accordance with existing video standards. For example, motion picture film created at 24 frames per second using a process known as 3:2 pull down, where 3 fields are derived from one frame and 2 are derived from the next, so as to provide the correct conversion ratio. Similarly, a computer graphics sequence created at 30 frames per second is converted to interlaced video at 60 fields per second using a pull down ration of 2:2, where 2 fields are derived from each CG frame. By recognizing that a video sequence originates from a progressive source, it is possible for a format converter to reconstruct the sequence in progressive format exactly as it was before its conversion to interlaced format.

Unfortunately, video transmission formats do not include explicit information about the type of source material being carried, such as whether the material was derived from a progressive source. Thus, in order for a video processing device to exploit the progressive nature of film or CG sources, it is first necessary to determine whether the material originates from a progressive source. If it is determined that the material originates from such a source, it is furthermore necessary to determine precisely which video fields originate from which source frames. Such determination can be made by measuring the motion between successive fields of an input video sequence.

It is common to measure at least two different modes of motion in determining the presence of a film source. Firstly, it is common to measure the motion between a given video field and that which preceded it by two fields. In this case, motion can be measured as the absolute difference between two pixels at the same spatial position in the two fields. A measure of the total difference between the two fields can be generated by summing the absolute differences at the pixel level over the entire field. The quality of the motion signal developed in this way is fairly high, since the two fields being compared have the same parity (both odd or both even) and therefore corresponding samples from each field have the same position within the image. Thus, any difference that is measured between two pixels will largely be the result of motion. The measure of motion between the first and third fields of the three fields that are derived from the same motion picture frame will be substantially lower than the measurements obtained during the other four fields, since the two fields being compared are essentially the same and differ only in their noise content. This does not provide sufficient information to avoid artifacts under certain conditions when a film sequence is interrupted. Also, in the case of an input sequence derived from film or CG in accordance with a 2:2 pull down ratio, no useful information is provided whatsoever.

A second mode of motion that can be measured is the motion between successive fields which are of opposite parity (one odd and the other even). Although this mode of measurement overcomes the limitations of the above, it is inherently a more difficult measurement to make since a spatial offset exists between fields that are of opposite parity. This is particularly true in the presence of noise and/or limited motion. A number of methods have been proposed in the prior art for the measurement of motion between fields of opposite parity. One such method is disclosed in U.S. Pat. No. 6,647,062 B2 entitled "Method and Apparatus for Detecting Motion and Absence of Motion between Odd and Even Video Fields", the contents of which are incorporated herein by reference.

The method described in U.S. Pat. No. 6,647,062 describes a motion detection method in which for either odd or even current field, the selected pixels for detecting motion between the current and the previous fields are not vertically symmetrical with respect to the missing pixels to be interpolated, depending on the parity of the current field. Moreover, in the system described in U.S. Pat. No. 6,647,062 and others in the prior art, the footprint of the selected pixels for detecting motion near a specified position in the temporal-vertical plane is not temporally symmetrical with respect to the missing pixel to be interpolated.

BRIEF SUMMARY OF THE INVENTION

The present invention overcomes the inadequacies and deficiencies of the prior art as discussed hereinabove. The present invention provides a video field motion detection measuring scheme and system. According to the present invention, a method and system are provided whereby the motion between a video field and its previous and subsequent video fields at a specified position is described.

According to an aspect of the present invention, the signal values of one set of vertically adjacent pixels from a video field of one parity and two other sets of vertically adjacent pixels from the two neighboring video field of the opposite parity are measured respectively such that when taken together, these pixels represent relevant samples of an image near the vertical and temporal positions and three motions values are calculated between (1) the field and its previous video field; (2) the field and its subsequent video fields; and (3) the previous field and the subsequent video field.

An aspect of the invention includes a method and a system of using the overall level of motion at the defined position which is determined by combining the information from the three motion values, calculated at the specified spatial and temporal locations using data processing techniques such as accumulation. In one embodiment, the data processing technique used in calculating at the specified spatial and temporal location is quantization. In another embodiment, the data process technique used in calculating at the specified spatial and temporal location is erosion and dilation. The level of motion information can be applied to per-pixel motion adaptive interlaced-to-progressive video format converter (i.e., a de-interlacer).

According to another aspect of the invention, a method and system are provided for measuring the level of motion at a specified position between video field of the same and opposite parity with greater reliability and robustness in the presence of noise and/or high vertical spatial frequencies and the combined motion information can be applied to a de-interlacer method selection module to dynamically switch or fade between different de-interlacer method based on the motion detection result.

A still further aspect of the invention includes a method and system for video field motion detection for selected pixels by detecting motion between the current and previous field by a vertically symmetrical approach with respect to the missing pixel to be interpolated in the current field. Such an approach provides a footprint of selected pixels for detecting motion near a specified positions in the temporal-vertical plane with respect to the missing pixel to be interpolated. In one embodiment, the footprint of selected pixels for detecting motion near a specified position in the temporal-vertical plane is both vertically and temporally symmetrical with respect to the missing pixel to be interpolated, allowing for a better vertical-temporal behavior and performance for motion-adaptive de-interlacer downstream than those of the prior art.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

FIG. 2 is a schematic representation showing how motion may be measured between successive fields of opposite parity using second method according to the prior art.

FIG. 3 is a schematic representation showing how motion may be measured between successive fields of opposite parity using a third method according to the prior art.

FIG. 4 is a schematic representation showing how motion may be measured between successive fields of opposite parity using a fourth method according to the prior art.

FIG. 7 is a schematic representation of a prior art method using four pixel positions where there is no motion between successive fields.

DETAILED DESCRIPTION OF THE INVENTION

Referring more specifically to the drawings, for illustrative purposes the present invention is embodied in the apparatus and methods generally shown in FIG. 8 through FIG. 21. It will be appreciated that the apparatus may vary as to configuration and as to details of the parts, and that the method may vary as to the specific steps and sequence, without departing from the basic concepts as disclosed herein.

Many well-known elements (e.g., memory, data busses, interfaces) have been omitted from the accompanying drawings so as to more clearly show embodiments of the invention. Like-numbered elements shown in the various drawings represent like elements.

Figure 1:
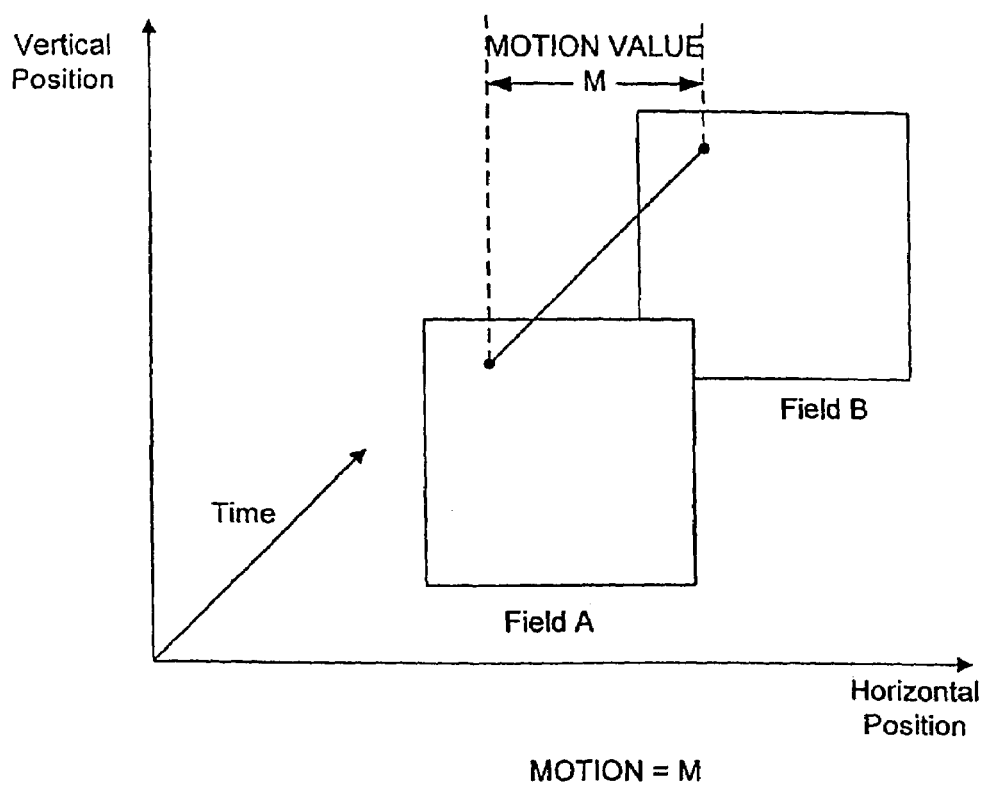
FIG. 1 is a schematic representation showing a prior art scheme of how motion my be measured between successive fields of opposite parity.

FIG. 1 is a prior art example of how motion may be measured between successive fields of opposite parity. One or more pixels of field A are compared with one or more pixels of field B having a set of spatial correlation with those from field A to produce an adjacent field local motion value M. One local motion value is produced for each spatial location in the current field, field B, and substantially all of these local motion values are summed together to produce a global motion value which represents the total motion from field A to field B.

FIGS. 2a through 2e show examples of adjacent field motion measurement corresponding to the general case shown in FIG. 1, as fully described in U.S. patent application Ser. No. 09/734,745, all the two fields measurements in the prior art are limited by the fact that vertical frequencies above some point are interpreted as motion even in a still image, due to the differing vertical position of pixels in fields of opposite parity.

FIG. 3 illustrates a measurement technique as disclosed in U.S. Pat. No. 5,689,301. The left half of the figure shows the spatio-temporal relationship between pixels in two successive video fields while the right half shows the value of each pixel relative to its vertical position for a particular image detail. The example used is that of an image detail that has a vertical spatial frequency exactly equal to the vertical frame Nyquist frequency. The formula for calculating the motion according to this fourth method is shown at the bottom of FIG. 3. The measure motion is taken as the lesser of the absolute differences between pixels P1 and P2, and between pixels P2 and P3, unless the value of pixel P2 is between the values of pixels P1 and P3, in which case the motion value is taken as zero. Although the pixel values used in this example are intended to represent samples of an image in which there is no motion, application of this technique results in a measured motion value equal to quantity A. Thus, this technique fails to reject as motion the difference between the pixels that arises owing to their different vertical positions.

FIG. 4 illustrates a measurement technique disclosed in U.S. patent application Ser. No. 09/734,745. The left half of the figure shows the spatio-temporal relationship between pixels in two successive video fields while the right half shows the value of each pixel relative to its vertical position for a particular image detail. The example used is that of an image detail that has a vertical spatial frequency exactly equal to the vertical frame Nyquist frequency. The formula for calculating the motion according to one aspect of the prior art described in the patent application is shown at the bottom of FIG. 4. The measured motion is taken as the lesser of the absolute differences between pixels P1 and P2, pixels P2 and P3, and between pixels P3 and P4, unless the value of either pixels P2 or P3 is between the values of its immediate neighbors, in which case the motion value is taken as zero. Using this technique, the motion value generated in the example is equal to quantity A, since no pixel value is between that of its immediate neighbors. Thus, this technique on its own also fails to reject as motion the difference between pixels that arises owing to their different vertical positions.

Figure 5:
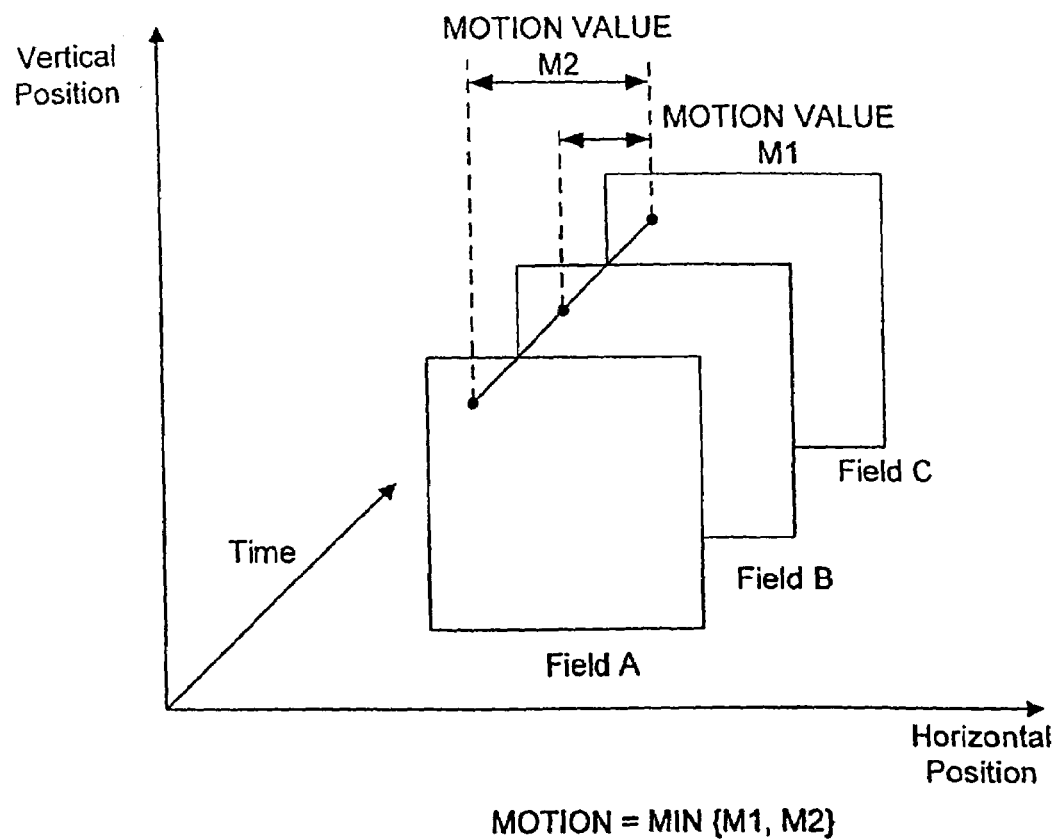
FIG. 5 is a schematic representation showing how motion may be measured between successive fields of opposite parity using a fifth method according to the prior art.

FIG. 5 illustrates another prior art motion detection method. A local motion value M1 is derived from two successive fields of opposite parity, either A and B or B and C, preferably the most recent two, using one of the aforementioned adjacent field motion measurements, is compared with a local motion value M2 derived from two successive fields of the same parity, A and C. The minimum of the two motion values is taken. FIG. 6a through FIG. 6e are exemplary implementations of the prior art method illustrated in FIG. 5 that are used to produce local motion value M2 by comparing pixels P2 and P2'. The final local motion value is equal to the minimum of M1 and M2.

Figure 6E:
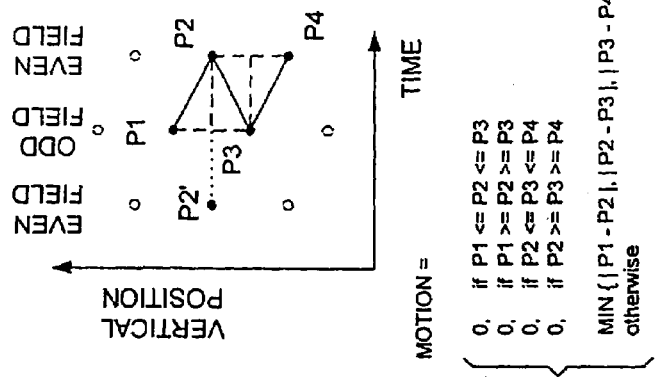
FIG. 6 is a schematic representation showing details of how motion may be measured by comparing motion values derived from successive fields of opposite parity and those derived from successive fields of the same parity of one method of the prior art.
Figure 6D:
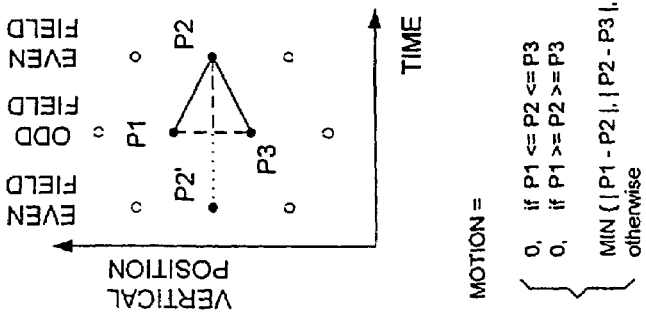

FIG. 7 is another prior art example of the motion measure method illustrated in FIG. 6e. The left half of the figure shows the spatio-temporal relationship between pixels in four successive video field, or two video frames. The right half shows the three dimensional representation of the value of each pixel relative to its vertical position for a particular image detail over two video frames. Since the video sequence represents a still image, the value of pixel P1 equals that of P1', P 2 equals P2', P 3 equals P3', and P4 equals P4'. The example used is that of an image detail that has vertical spatial frequency exactly equal to the vertical frame Nyquist frequency. The formula for calculating the motion is shown at the bottom of FIG. 7. The measured motion is taken as the lesser of the absolute differences between pixels P1 and P2, pixels P2 and P3, pixels P3 and P4, and between pixels P2 and P2' unless the value of either pixel P2 or pixel P3 is between the values of its immediate neighbors, in which case the motion value is taken as zero. Using this technique, the motion value generated in the example is zero, since P2 and P2' are equal.

Opposite-Field Motion Detection System

Figure 8:
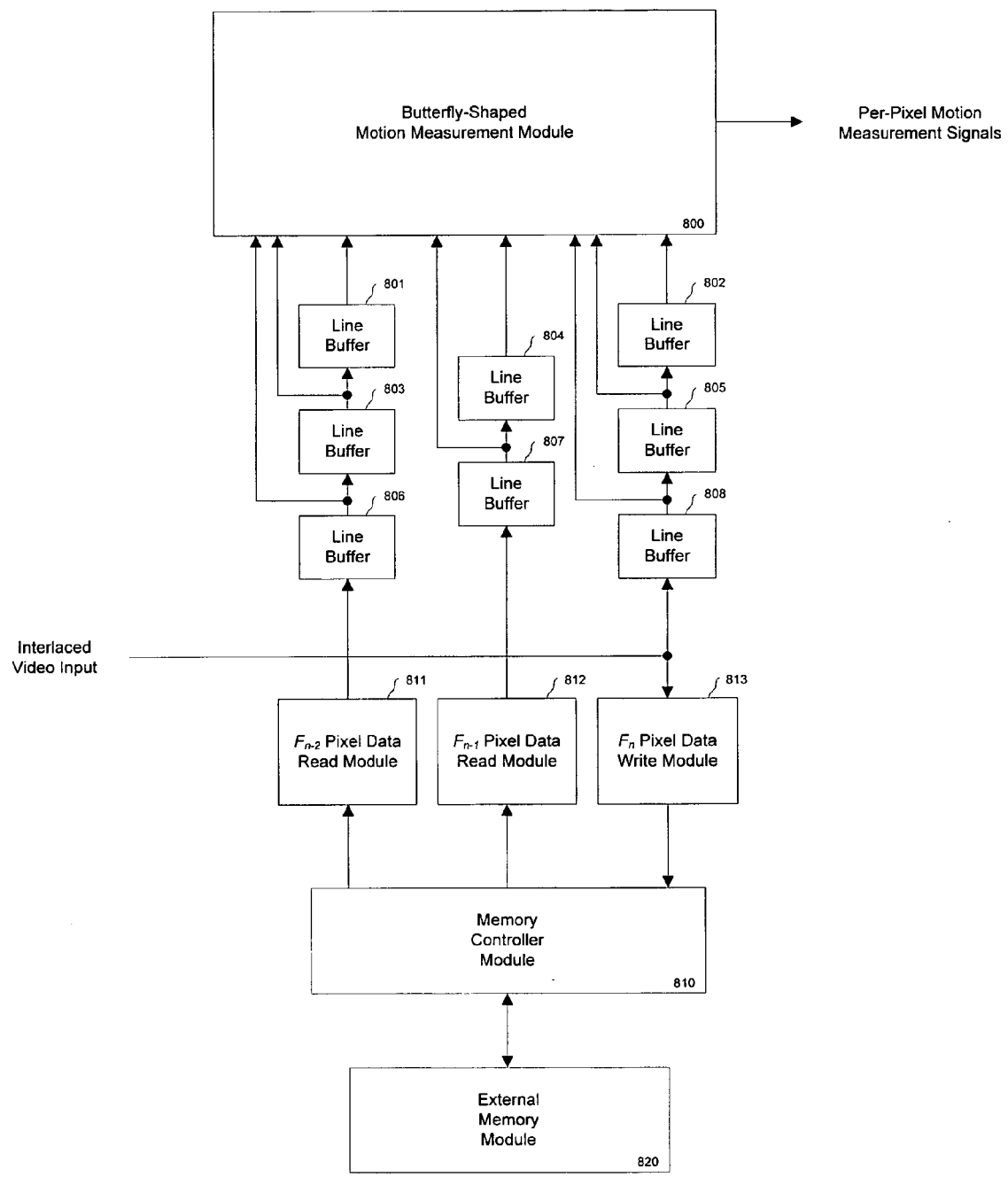
FIG. 8 is a schematic representation showing how motion is measured between successive fields of opposite parity using a method according to the present invention.

FIG. 8 is a schematic representation of one embodiment of the same and opposite-field motion detection system of the present invention. An input video signal is applied to the input of the memory 810 and line buffers 806, 807 and 808. The output of line buffers 806, 807 and 808 are applied to line buffers 803, 804 and 805 respectively. The output signals for line buffers 806, 807 and 808 are also applied to the per-pixel motion measurement module 800. To detect the opposite-field motion (i.e., object movement or object brightness change) between adjacent even-odd or odd-even field pair, the present invention provides a scheme to weave the two fields together to form a frame and attempt to detect spatial frequency of the Nyquist rate (i.e., half the spatial sampling rate) in the vertical direction. Namely, the present invention detects, in the vertical direction, groups of adjacent scan lines that exhibit bright-dark-bright-dark alternating pattern (I.e., Nyquist rate frequency). The level of motion at a specified position between the two fields is then represented by the amplitude of this alternating pattern between the chosen pixel values close to the specified position from the two corresponding fields of opposite parity.

In one embodiment, for each pixel position (x, y) in the combined frame from the even-odd or odd-even field pair, m vertical consecutive pixels are selected as set S for the calculation. If m is an even number, the selected pixel S contains pixels from P(x, y−m/2) to P(x, y+m/2−1); if m is an odd number, the selected pixel S contains pixels from P(x, y−(m−1)/2) to P(x, y+(m−1)/2). The selected pixel set S is partitioned into two disjoined sets: one set $S_1$ that contains all pixels from the current field $F_n$; the other set $S_2$ that contains all pixels from the previous field $F_{n-1}$. The measure of opposite-field motion $M_{opposite}(X, y, n)$ between the two fields at the pixel position (x, y) is calculated using the equations below:

$$D_1 = \min(S_1) - \max(S_2) \qquad (1)$$

$$D_2 = \min(S_2) - \max(S_1) \qquad (2)$$

If $(D_1 > 0)$ or $(D_2 > 0)$ $$M_{opposite}(x,y,n) = \min(|D_1|, |D_2|)$$

else $$M_{opposite}(x,y,n) = 0 \qquad (3)$$

An alternative equation that may be used to calculate the measure of opposite-field motion from the equations above will be as follows:

If $D_1 > 0$ $$M_{opposite}(x,y,n) = D_1$$

else if $D_2 > 0$ $$M_{opposite}(x,y,n) = D_2$$

else $$M_{opposite}(x,y,n) = 0 \qquad (4)$$

A further alternative embodiment may be as follows:

$$M_{opposite}(x,y,n) = \max(D_1, 0) + \max(D_2, 0). \qquad (5)$$

Figure 9:
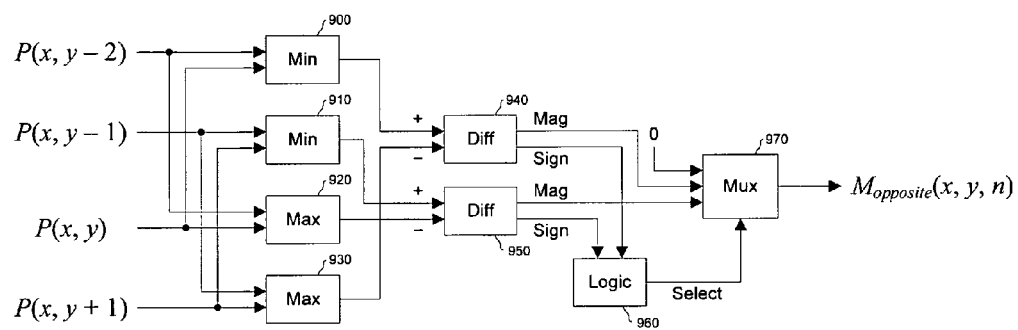
FIG. 9 is a schematic representation showing how motion is measured between successive fields of opposite parity using an embodiment of the present invention.
Figure 10:
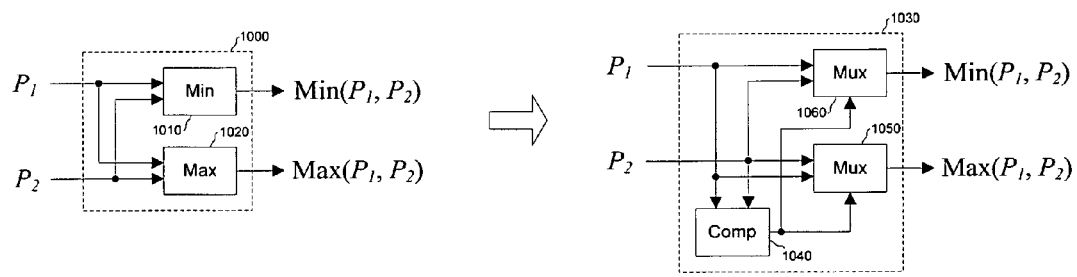
FIG. 10 is a schematic representation showing a simplified min-max pair used in the embodiment shown in FIG. 9.

FIG. 9 is a schematic representation of one embodiment of the opposite-field motion detection system of the present invention. The system in FIG. 9 comprises minimum registers 900 and 910 for storing the minimum pixel pair values of input pixels, maximum registers 920 and 930 for storing maximum pixel pair values of input pixels, differencing circuits 940 and 950 for comparing the signals values of the input pixel signal pairs, select logic 960 and multiplexer 970 for selecting the opposite-field motion signal between the two field at the pixel being measured. The embodiment illustrated in FIG. 9 uses m=4 using equations (1), (2), (4) from above. The minimum-maximum pair for each input pixel pair can be simplified as illustrated in FIG. 10.

The opposite-field motion detection scheme tries to detect vertical spatial frequency of the Nyquist frequency among the m pixels. For an ideal scheme, the detected motion measure should be zero for all vertical spatial frequency less than the Nyquist frequency. However, for non-ideal algorithms, it is possible that stationary objects in the combined frame with fine details (i.e., high spatial frequency components close to Nyquist frequency) along the vertical direction may cause false detection of the scheme. In one embodiment, this will result in a non-zero false detection probability $Prob_F$. The algorithm will not generate false detection for normalized vertical spatial frequency less than the false detection threshold frequency $f_T$.

Figure 11:
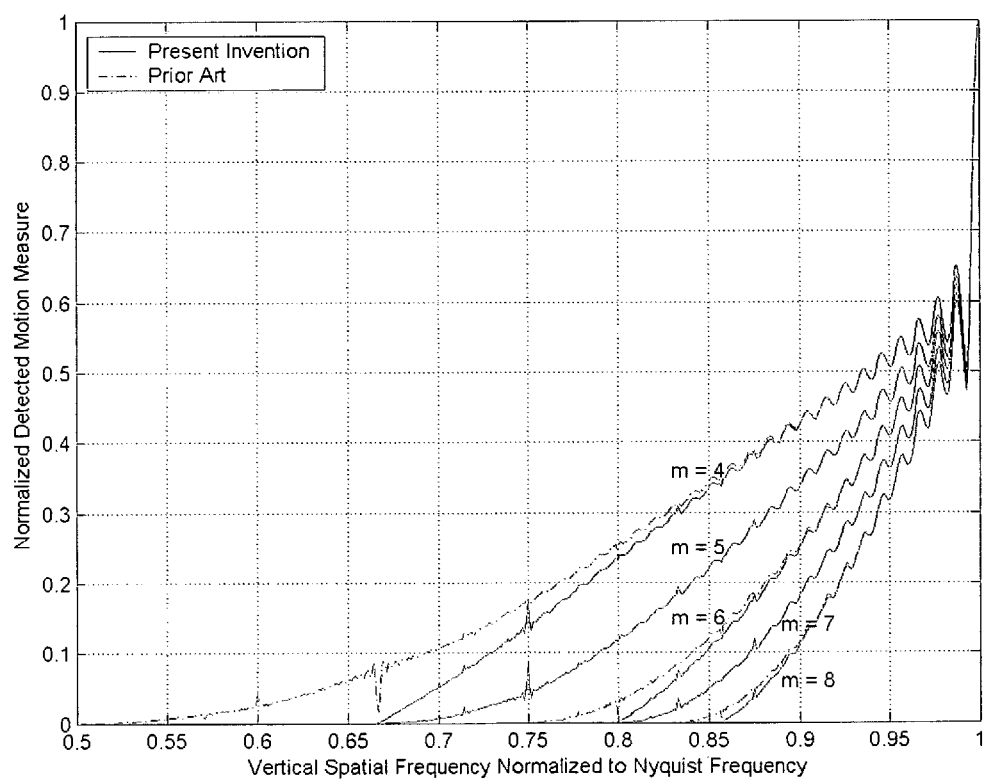
FIG. 11 is a graphical plot of normalized detected motion measure versus vertical spatial frequency normalized to Nyquist frequency for different numbers of vertically consecutive pixels selected for the motion detection methods.

As illustrated in FIG. 11, if a larger m is used, the normalized detected motion measure for vertical spatial frequency lower than the Nyquist frequency can be reduced and thus the false detection probably $Prob_F$ can also be reduced. However, using larger m will also increase the miss detection probability $Prob_M$ of the scheme. The motion measure will be larger than zero only if all m vertically adjacent pixels in the combined field exhibit alternating bright-dark pattern. The scheme will not detect any motion region that covers less than m pixels vertically. Note that if m is even, the m pixels in set S are not symmetrically located with respect to P(x, y). This will cause the motion measure to have a non-zero bias toward one side vertically. A refined design to overcome these problems will be described below.

Also illustrated in FIG. 11 is the performance of the detection scheme described in U.S. Pat. No. 6,633,612. According to the simulation results, if m is even the scheme for the present invention outperforms the prior art. If m is odd, the performances of the two scheme are exactly the same. For the present invention, if m is even or odd, the false detection threshold frequency $f_F$ will be $(m-2)/(m-1)$ or $(m-3)/(m-2)$, respectively. In the prior art, the false detection threshold frequency $f_F$ is always $(m-3)/(m-2)$ for all m. The present invention is better than in the prior art in that (1) For even m, the present invention will achieve a lower false detection probability $Prob_F$ and a higher false detection threshold frequency $f_T$. (2) unlike the prior art, the present invention does not consider the order of the m input pixels, as long as they are partitioned into two disjoint sets. So there is no need to use multiplexers to switch the input pixels when the current field is alternating between even and odd fields.

Same-Field Motion Detection Scheme

The same-field motion detection scheme of the present invention is described below. Because the scan lines of the two even or odd fields, between which the motion is to be detected, are located at the same position in their respective frames, the level of motion at a specified position between the two fields is directly represented by the difference between the two pixel values at the same position from the two corresponding fields of the same parity. For each pixel position (x, y) in the even-even or odd-odd field pair, there are two pixels $P_n(x, y)$ and $P_{n-2}(x, y)$ in the current field $F_n$ and earlier field $F_{n-2}$, respectively that are located at the same position. The measure of same-field motion $M_{same}(x, y, n)$ for the current field $F_n$ at the pixel position (x, y) is calculated by the following equation:

$$M_{same}(x,y,n) = |P_n(x,y) - P_{n-2}(x,y)| \qquad (6)$$

PREFERRED EMBODIMENTS OF THE PRESENT INVENTION

Figure 12:
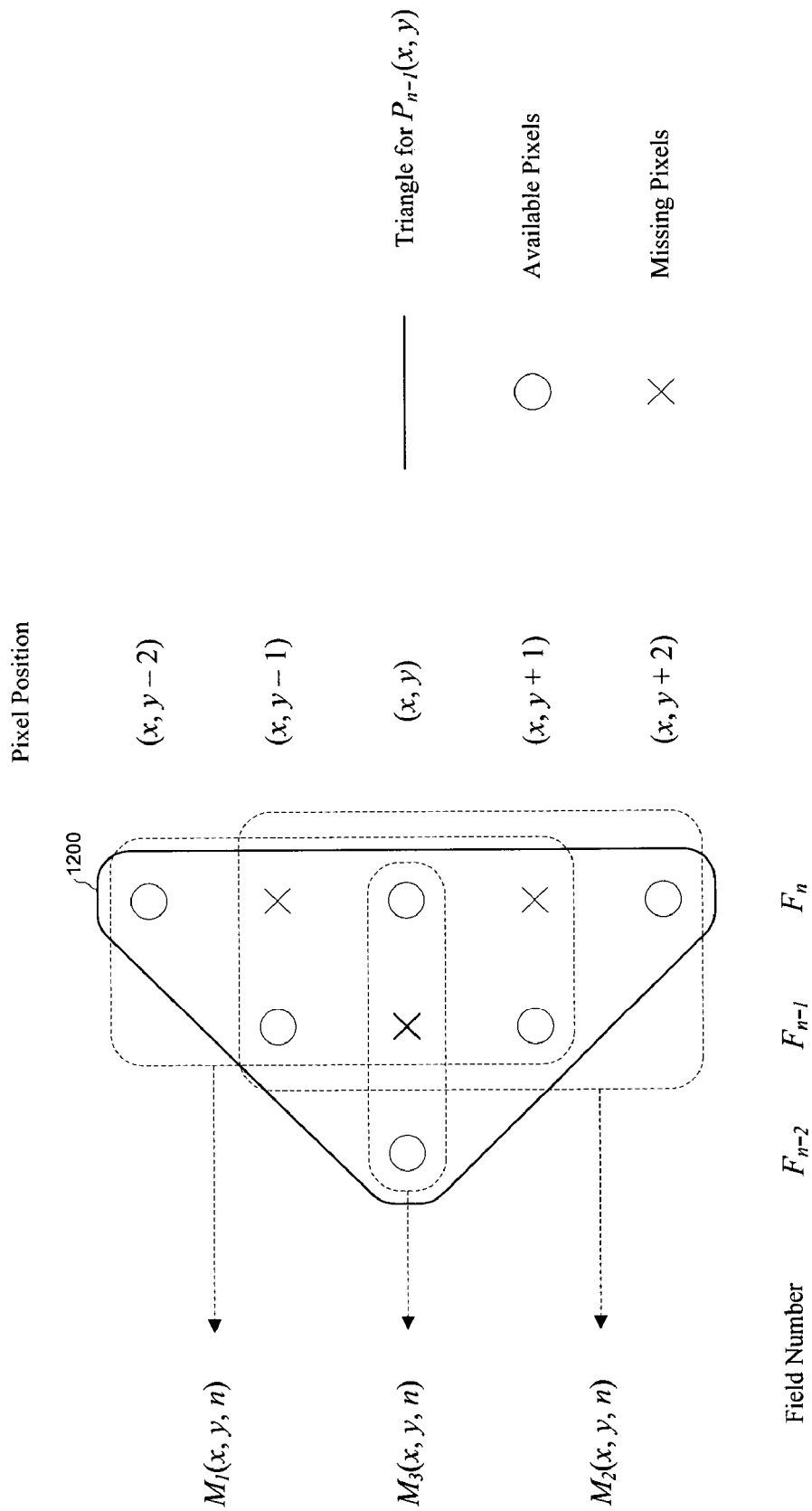
FIG. 12 is a schematic representation showing input pixels from a triangular-shaped footprint in a temporal-vertical plane for a motion measurement module using an embodiment of the present invention.

In one embodiment of the present invention, three pixels from the current field $F_n$, two pixels from the previous field $F_{n-1}$ with opposite parity, and one pixel from the second previous field $F_{n-2}$ with the same parity are used to calculate both the same and opposite-field motion measures. All the six pixels used are vertically adjacent in their respective frame and they present a triangular-shaped footprint in the temporal-vertical plane as illustrated in FIG. 12. The motion measurement module takes the six pixels as its input and calculates the following three motion measures using the opposite-field motion detection scheme with m=4 and same-field motion detection scheme respectively as follows:

$$M_1(x,y,n)=M_{opposite}(x,y,n)$$

$$M_2(x,y,n)=M_{opposite}(X,y+1,n)$$

$$M_3(x,y,n)=M_{same}(x,y,n)$$

The pixels needed for calculating each motion measures are also illustrated in FIG. 12.

Figure 13:
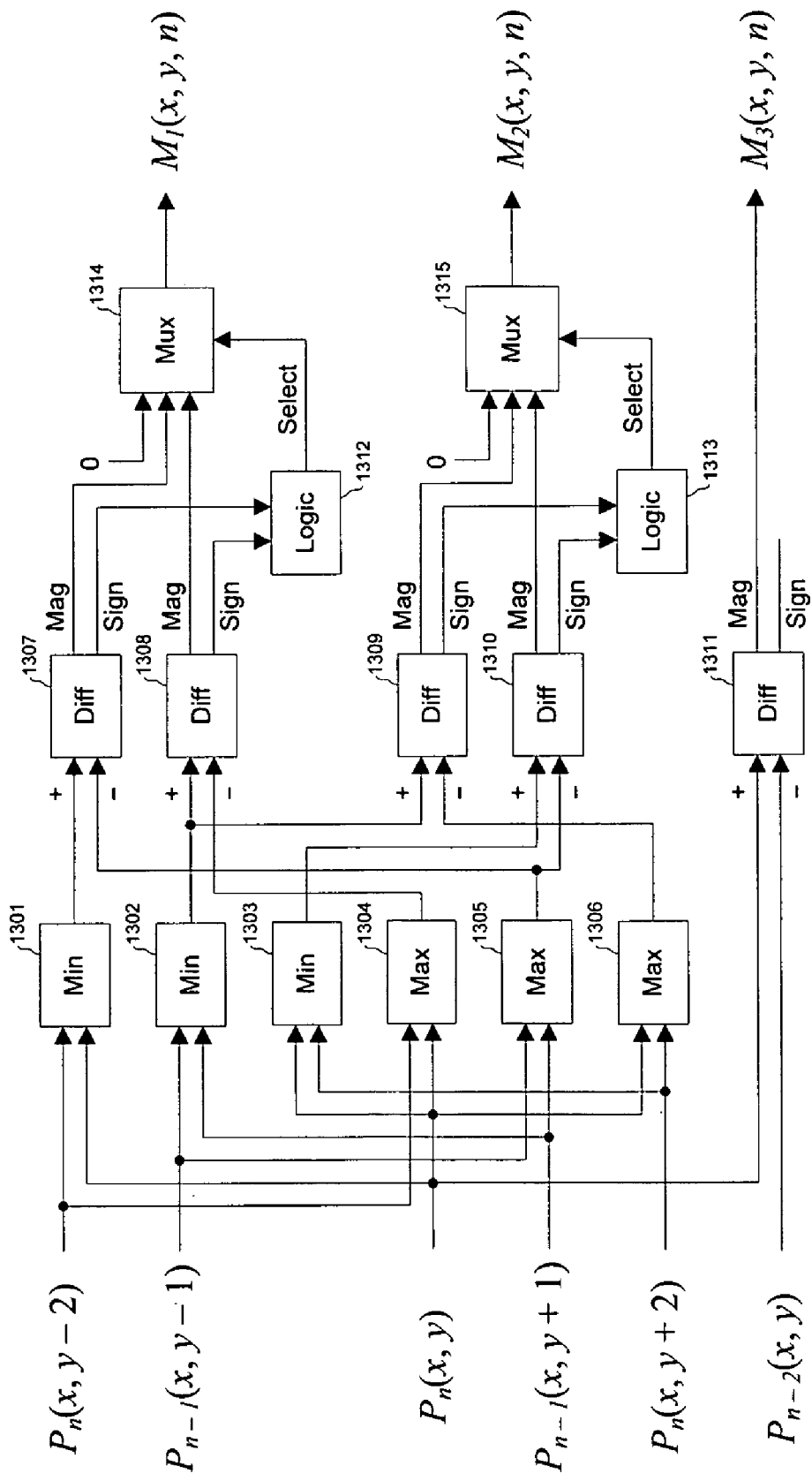
FIG. 13 is a schematic circuit representation for the triangular-shaped motion measurement module of FIG. 12.
Figure 14:
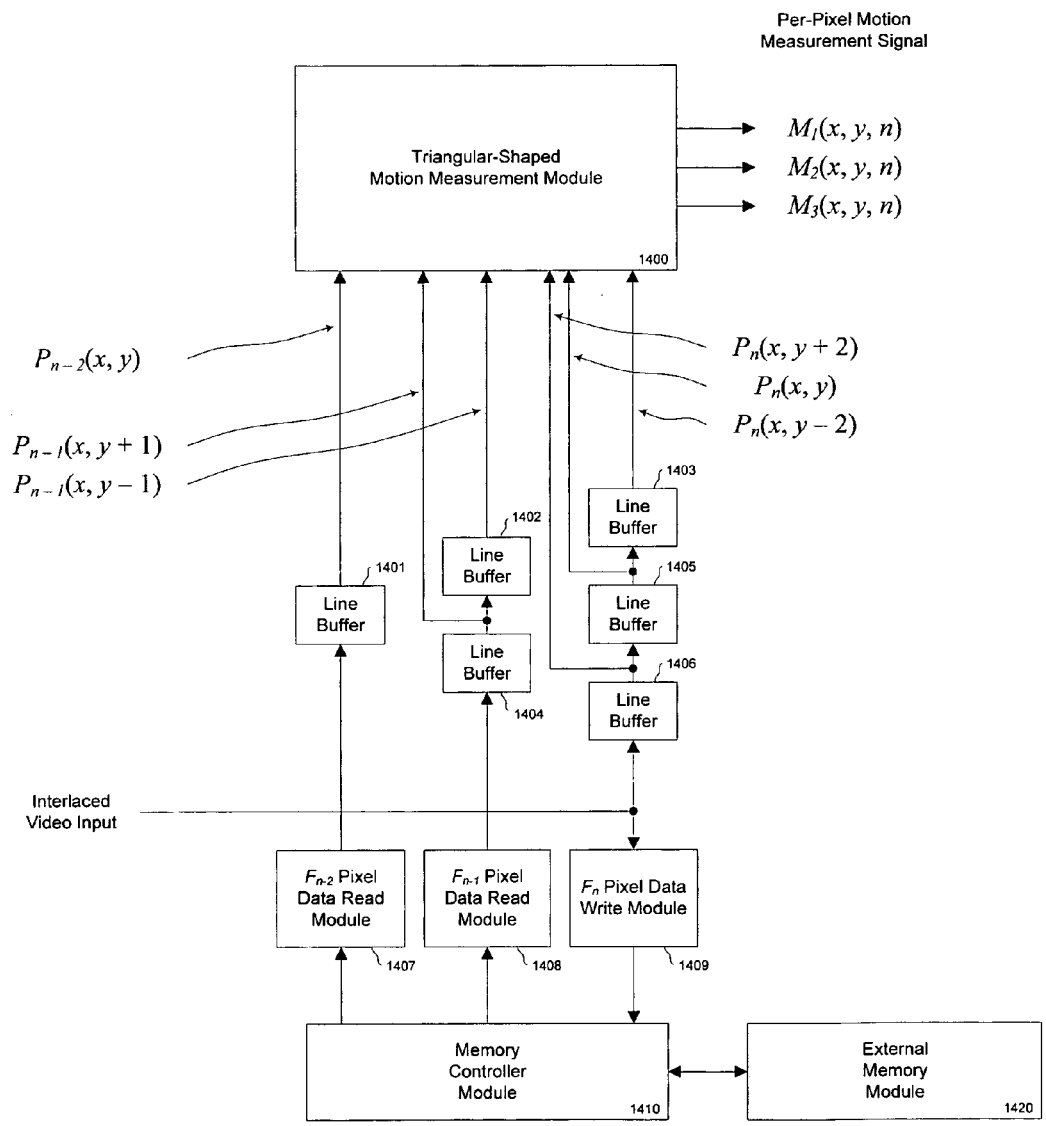
FIG. 14 is a schematic representation of the embodiment of the triangular-shaped motion measurement module of FIG. 12.
Figure 15:
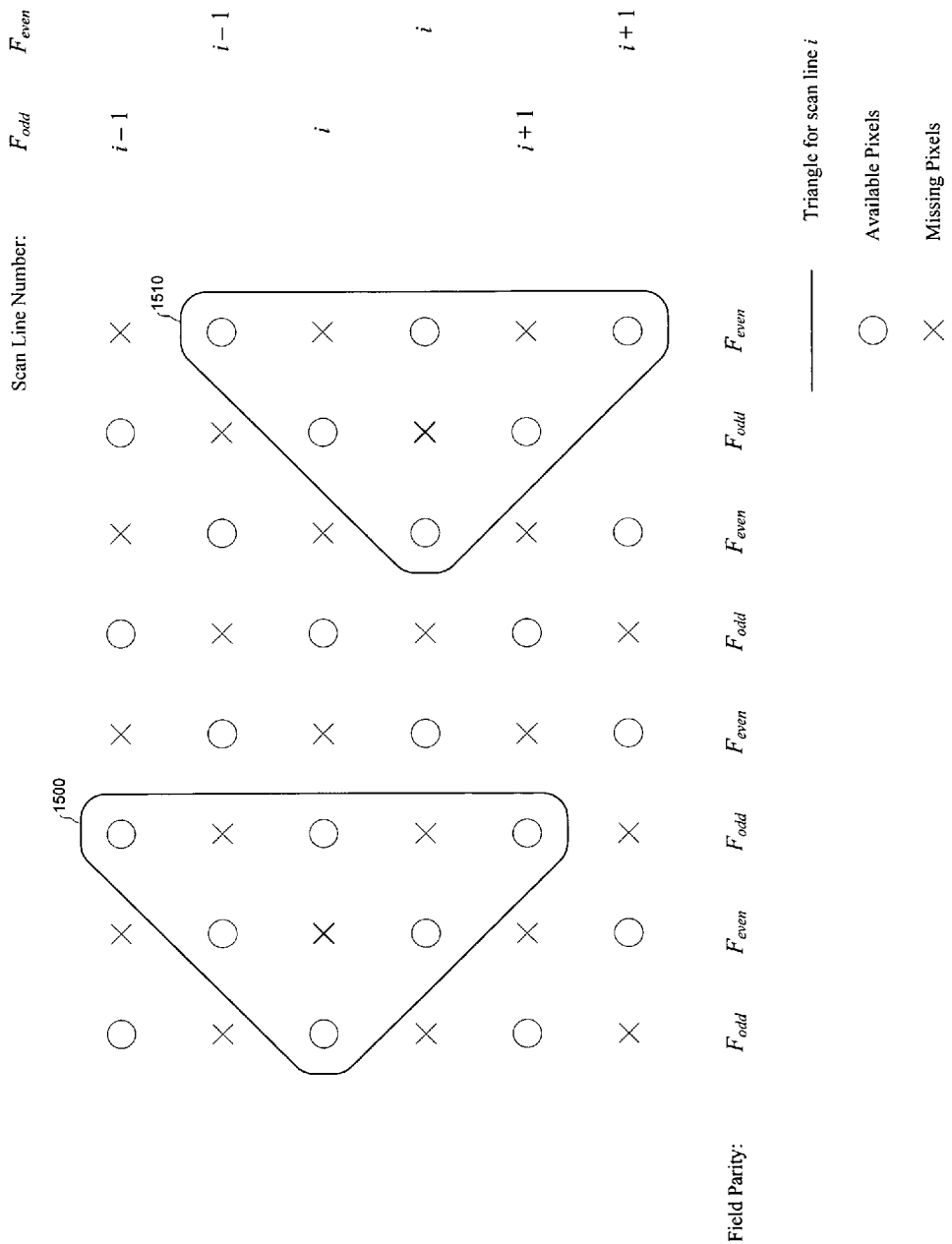
FIG. 15 is a schematic representation showing input pixels for triangular-shaped motion measurement module in two possible field sequences in a temporal-vertical plane using an embodiment of the present invention.

FIG. 13 illustrates one embodiment of the motion measurement module of the present invention using equations (1), (2), (4), and (6). The module shown in FIG. 13 comprises a plurality of minimum registers 1301-1303, maximum registers 1304-1306, differencing circuits 1307-1311, selector logic 1312-1313 and multiplexers 1314-1315. If the most recent pixel P(x, y) from the current field $F_n$ are taken directly from the input video signal to the module, which means line buffer 1406 can be omitted a total of five line buffers are needed. Two line buffers (1403 and 1405) are needed for field $F_n$, two line buffers (1402 and 1404) are also needed for field Fn−1 and one line buffer (1401) is needed for field $F_{n-2}$. The embodiment of the motion measurement block is shown below in FIG. 14. There are two possible field sequences when the motion measurement module does its calculation: $(F_{n-2}, F_{n-1}, F_n)$=(odd, even, odd) or $(F_{n-2}, F_{n-1}, F_n)$=(even, odd, even). Since odd and even scan lines are located at different positions of their respective frames, the order to read from the external field buffer memory the six input pixels for the motion measurement module differs for the two possible field sequences. FIG. 15 shows the input pixels for the motion measurement module in the two possible field sequences.

Figure 16:
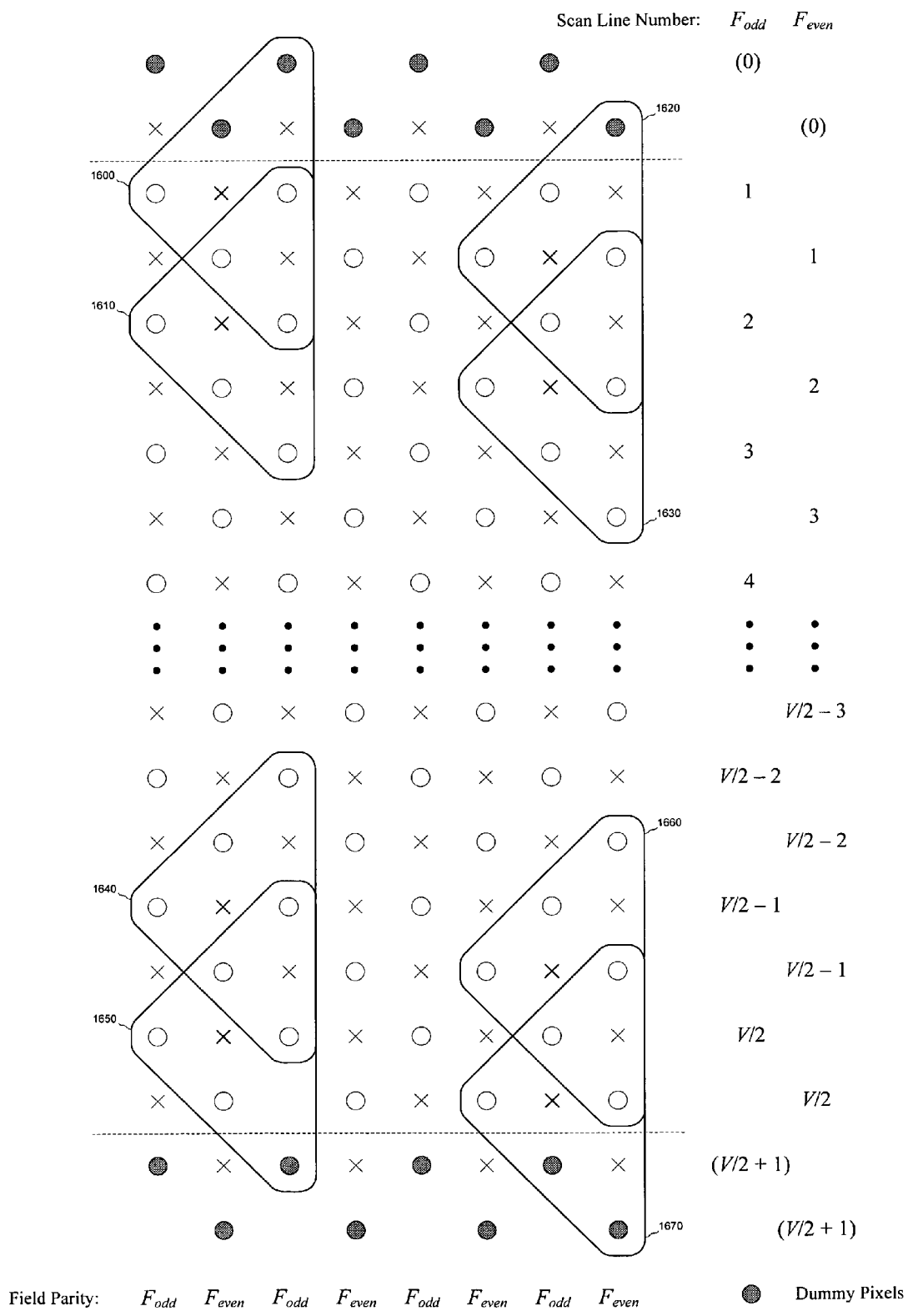
FIG. 16 is a schematic representation showing scan line read sequences for triangular-shaped motion measurement module for two possible field sequences using an embodiment of the present invention.

FIG. 16 illustrates the scan line read sequences of the motion detection block for the two possible field sequences. In order to calculate all the available motion measures at the top and bottom of each field, two dummy scan lines are added to the top and bottom of each field. For the V scan lines in each frame (e.g., V=480 for NTSC and V=576 for PAL/SECAM), there are V/2 scan lines in each of the even and odd field, assuming that V is even. With the two dummy lines added to the top and bottom of each field, there will be V/2 iterations for the motion measurement module to calculate the three output motion measures ($M_1$, $M_2$, $M_3$), based on its six input pixels. In one embodiment of the present invention, after all the V/2 iterations, all the available opposite-field motion measures defined between field $F_n$ and field $F_{n-1}$ and all the available same-field motion measures defined between field $F_n$ and field $F_{n-2}$ are calculated for both of the two possible field sequences. There is no lost of motion information at the top and bottom end of each field for both of the two possible field sequences. The dummy lines are included in FIG. 16 in order to facilitate the understanding of the embodiment. In one embodiment, there are no dummy lines needed. All opposite-field motion measures involving an input pixel from a dummy line should be set to 0, because that input pixel needed is not available.

Figure 17:
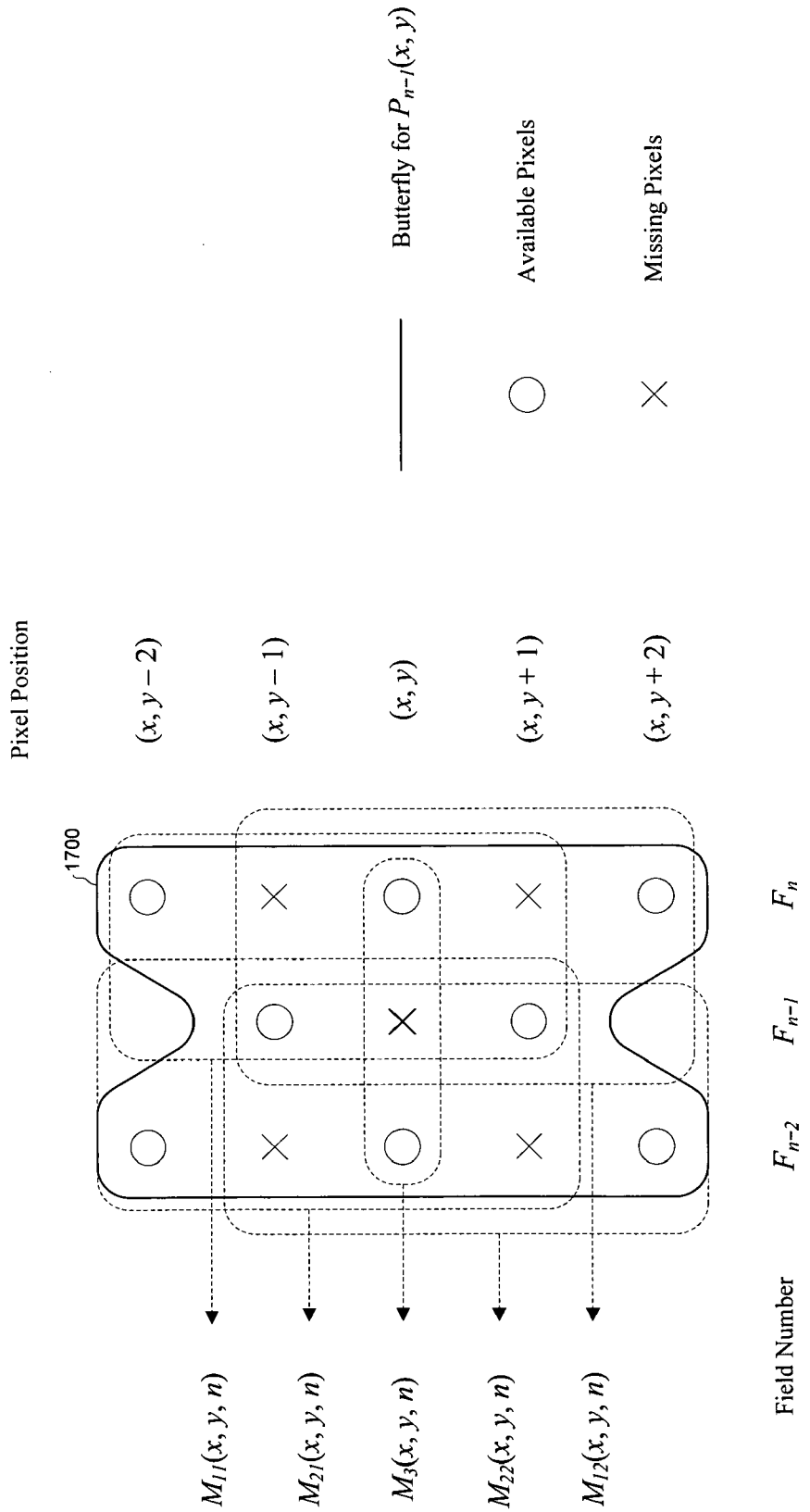
FIG. 17 is a schematic representation showing input pixels from a butterfly-shaped footprint in a temporal-vertical plane for a motion measurement module using another embodiment of the present invention.

FIG. 17 is a schematic representation of another embodiment of the present invention. In the embodiment illustrated in FIG. 17, three pixels from the current field $F_n$, two pixels from the previous field $F_{n-1}$ with opposite parity, and three pixels from the second previous field $F_{n-2}$ with the same parity are used to calculate both the same and opposite-field motion measures. All the eight pixels used are vertically adjacent in their respective frame and they present a butterfly-shaped footprint in the temporal-vertical plane. The motion measurement module takes the eight pixels as its inputs and calculates the following five motion measures using the opposite-field motion detection scheme with m=4 and same-field motion detect scheme, respectively are as follows:

$$M_{11}(x,y,n)=M_{opposite}(x,y,n)$$

$$M_{12}(x,y,n)=M_{opposite}(x,y+1,n)$$

$$M_{21}(x,y,n)=M_{opposite}(x,y,n-1)$$

$$M_{22}(x,y,n)=M_{opposite}(x,y+1,n-1)$$

$$M_3(x,y,n)=M_{same}(x,y,n)$$

Figure 18:
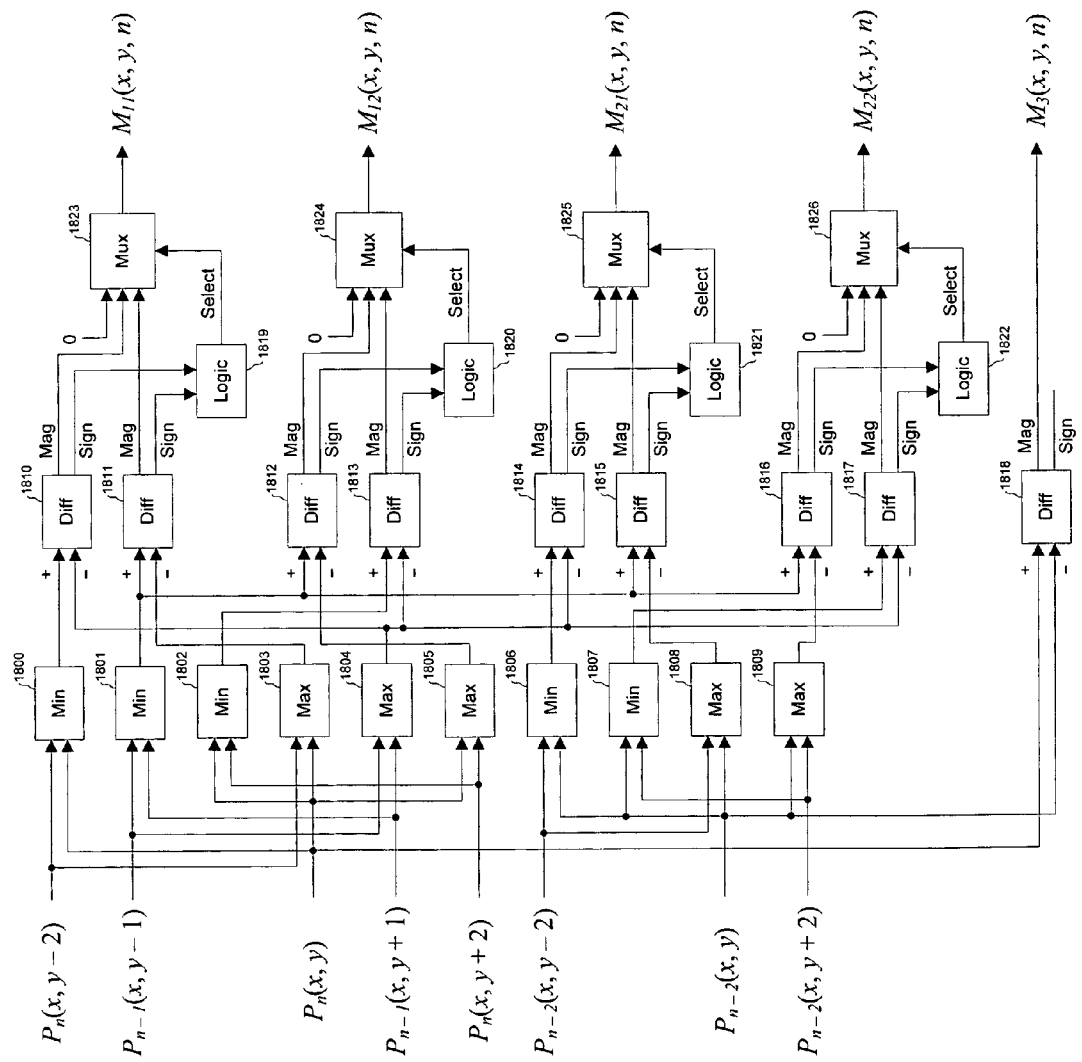
FIG. 18 is a schematic circuit representation for the butterfly-shaped motion measurement module of FIG. 17.

The pixels needed for the calculation of each motion measures are also shown in FIG. 17. FIG. 18 shows an embodiment of the motion measurement module using the equations (1), (2), (4) and (6).

Figure 19:
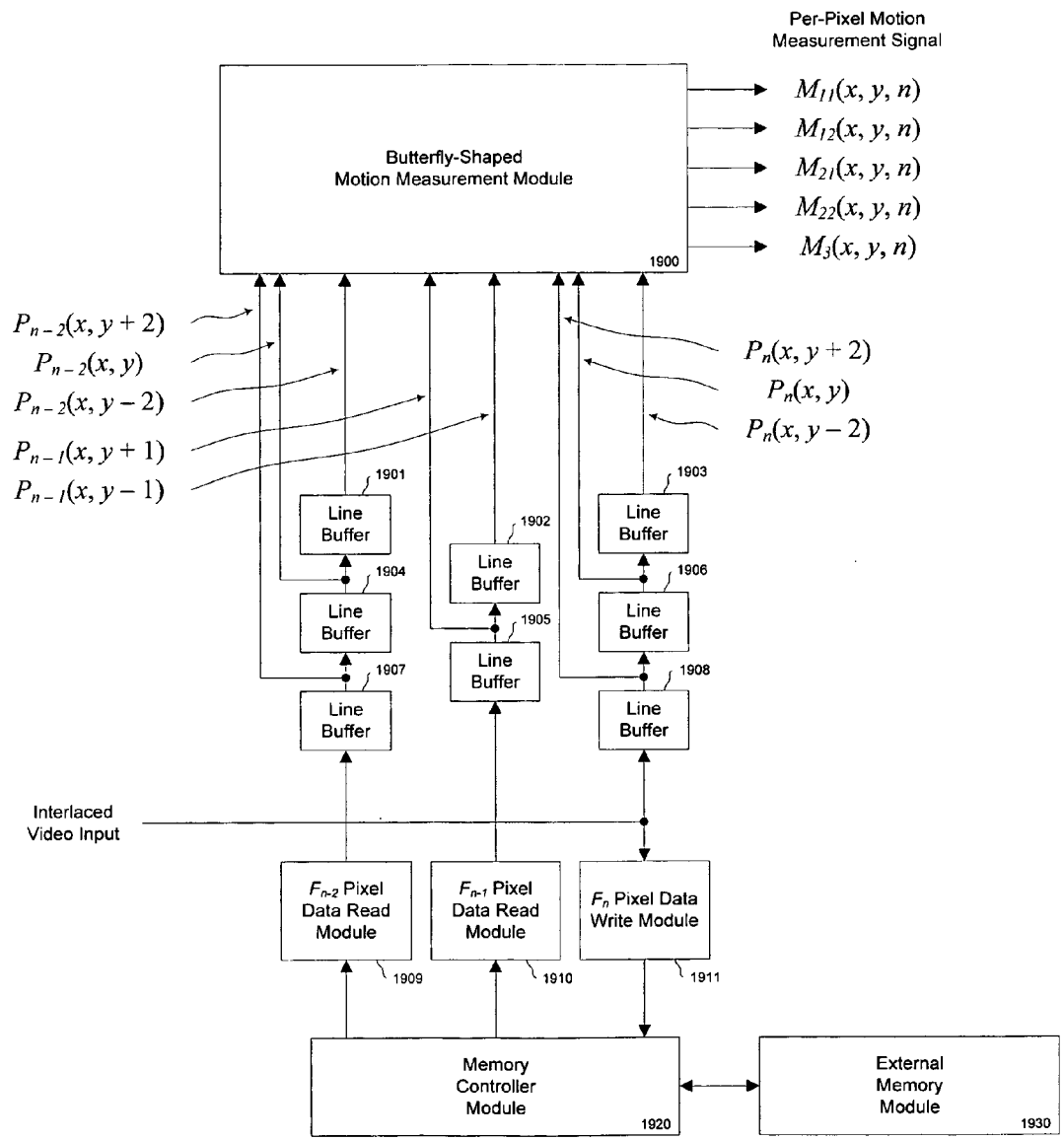
FIG. 19 is a schematic representation of the embodiment of the butterfly-shaped motion measurement module of FIG. 17.
Figure 20:
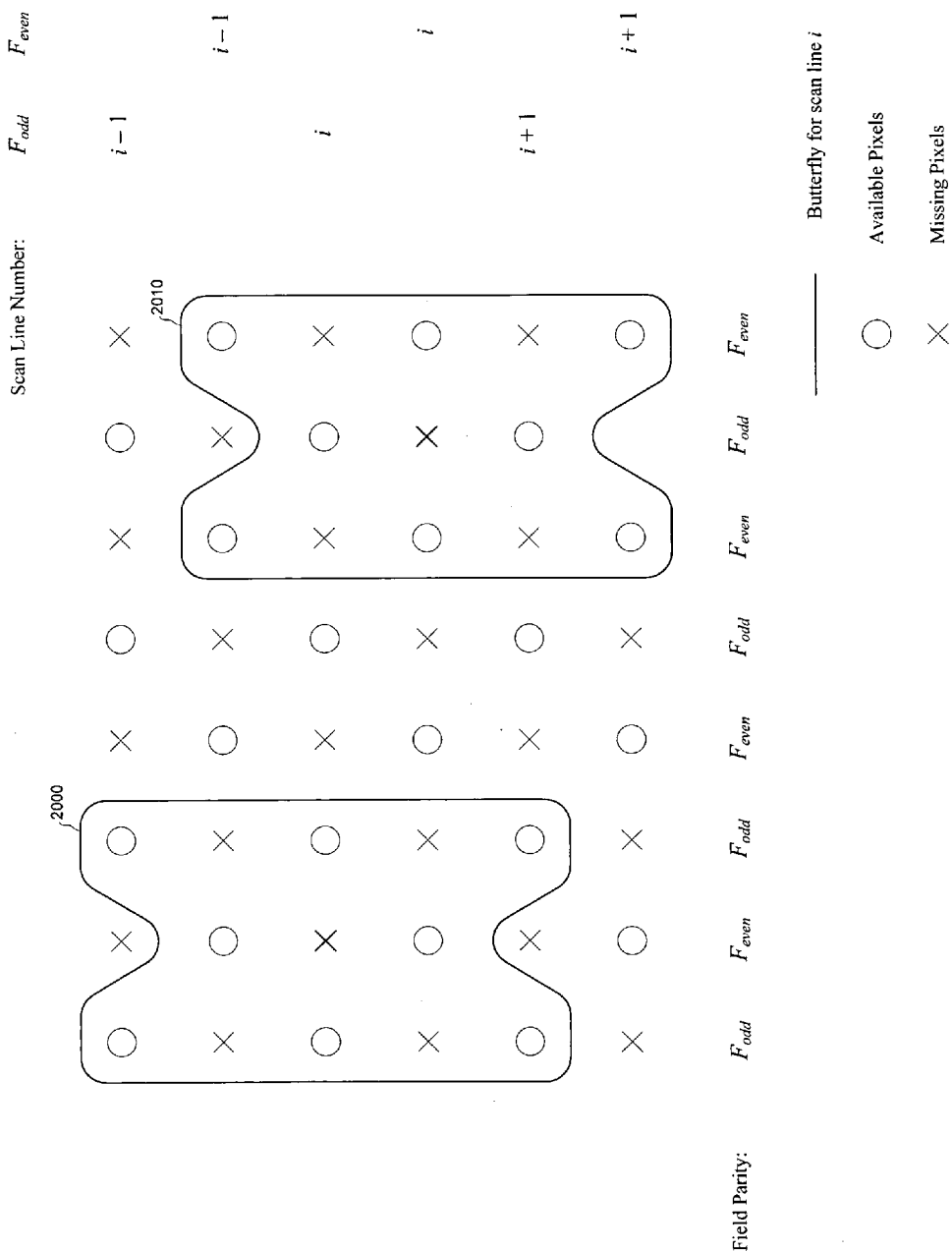
FIG. 20 is a schematic representation showing input pixels for butterfly-shaped motion measurement module in two possible field sequences in a temporal-vertical plane using another embodiment of the present invention.

FIG. 19 is a schematic representation of another embodiment of the motion measurement module of the present invention. In the embodiment illustrated in FIG. 19, if the most recent pixel P(x, y) from the current field $F_n$ are taken directly from the input video signal to the module which means line buffer 1908 can be omitted, a total of seven line buffers are needed for this implementation: two for the field $F_n$ (1903 and 1906), two for field $F_{n-1}$ (1902 and 1905), and three for field $F_{n-2}$ (1901, 1904 and 1907). There are two possible field sequences when the motion measurement module does its calculation: $(F_{n-2}, F_{n-1}, F_n)$=(odd, even, odd) or $(F_{n-2}, F_{n-1}, F_n)$=(even, odd, even). Since odd and even scan lines are located at different positions of their respective frames, the order to read from the external field buffer memory the eight input pixels for the motion measurement module differs for the two possible field sequences as shown in FIG. 20.

Figure 21:
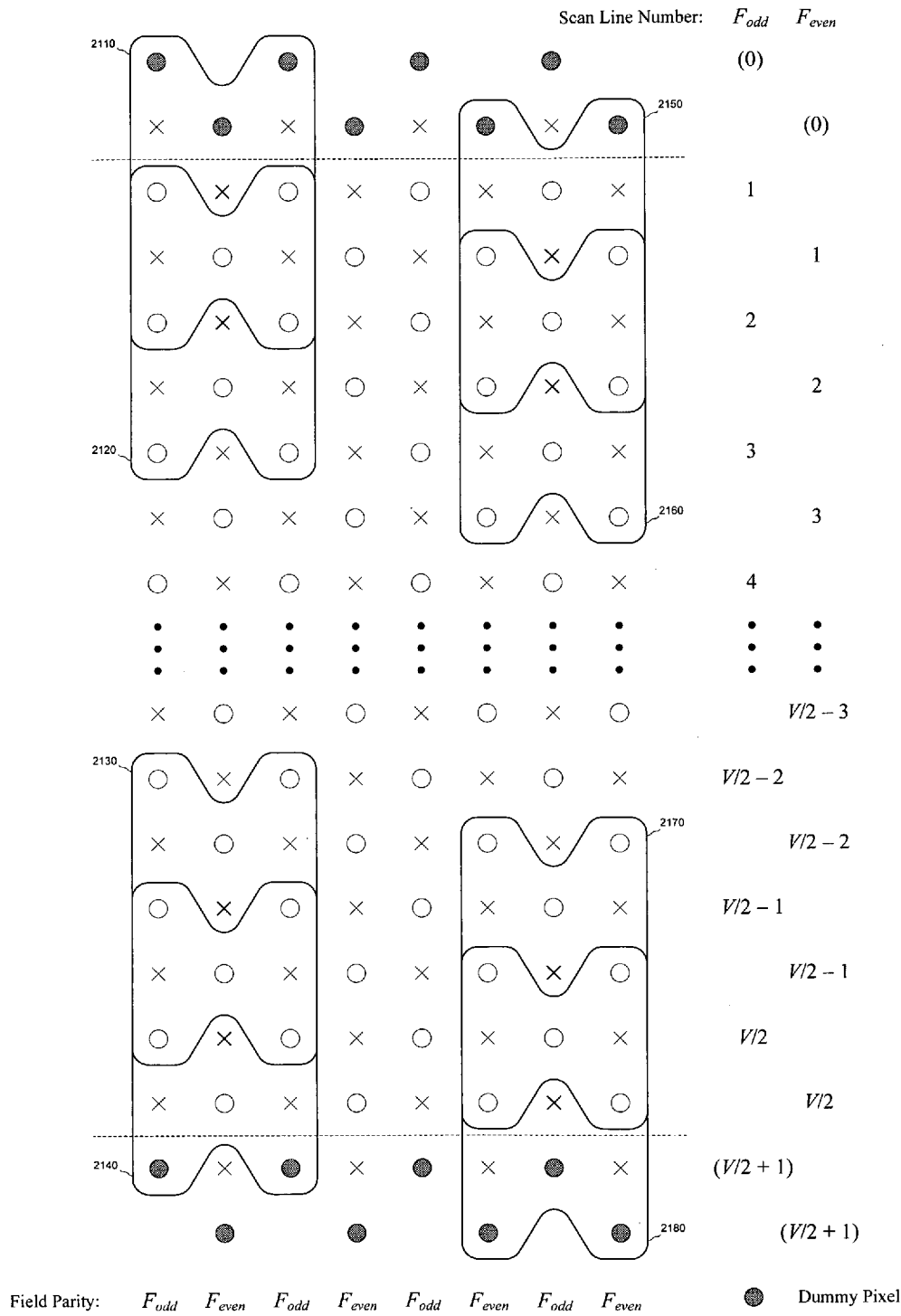
FIG. 21 is a schematic representation showing scan line read sequences for butterfly-shaped motion measurement module for two possible field sequences using another embodiment of the present invention.

FIG. 21 illustrates the scan line read sequences of the motion detection block for the two possible field sequences of the present invention. In order to calculate all the available motion measures at the top and bottom of each field, two dummy scan lines are added to the top and bottom of each field. For V scan lines in each frame (e.g., V=480 for NTSC and V=576 for PAL/SECAM), there are V/2 scan lines in each of the even and odd field, assuming that V is even. With the two dummy lines added to the top and bottom of each field, there will be V/2 iterations for the motion measurement module to calculate the five output motion measures ($M_1$, $M_2$, $M_3$, $M_4$, $M_5$), based on its eight input pixels. In one embodiment after the V/2 iterations, all the available opposite-field motion measures defined between field $F_n$ and field $F_{n-1}$ and between field $F_{n-1}$ and field $F_{n-2}$, and all the available same-field motion measures defined between field $F_n$ and field $F_{n-2}$ are calculated for both of the two possible field sequences. There is no loss of motion information at the top and bottom end of each field for both of the two possible field sequences. The dummy lines are included in FIG. 21 in order to facilitate the understanding of the embodiment of the present invention. In actual implementation, the dummy lines are not needed. All opposite-field motion measures involving an input pixel from a dummy line should be set to 0, because that input pixel needed is not available.

The motion measures calculated in the embodiments of the present invention described above are preferably per-pixel motion measures. They can be used to determine the level of motion between a specified pixel and its neighboring pixels in the temporal-vertical plane. Thus, a per-pixel motion-adaptive interlaced-to-progressive video format converter (e.g., a de-interlacer) can determine how to generate each of the interpolated pixels in an output video signal based on the per-pixel motion measures.

All or part of the per-pixel motion measures between two fields with opposite or same parity can be accumulated to generate the per-field motion measures, which represent the level of motion between the two fields or regions of the two fields. A non-linear function such as threshold or square-law can be applied to the per-pixel motion measures before the accumulation process to generate the per-field motion measures. Per-field motion measures are useful for the de-interlacer to determine the rules to be used to generate each of the interpolated pixels in its output video signal. For certain types of video inputs such as those derived from purely film sources by 2:2 or 3:2 pull-down processes or those derived from progressive video sources by segmented-field (e.g., 1:1 pull-down) process, per-field motion measures can be used by the de-interlacer to determine the underlying properties of the video input and handle it properly. Even for video inputs derived from interlaced video sources, per-field motion measures can be used to switch among different rules of applying per-pixel motion measures to generate its video output, thus it can handle still frames, frames with small or large motion, and frames with scene changes properly. Note that per-field motion measures usually are more reliable than per-pixel motion measures due to the large number of per-pixel motion measures used in its accumulation process.

Both per-pixel and per-field motion measures can be quantized to reduce the number of bits used to represent its values. Per-field motion measures are more reliable, while the per-pixel motion measures provide more insight when there are both stationary and moving objects and/or background in the current field. In one embodiment, after the quantization process, per-pixel motion measures can further go through an erosion and a dilation process to further improve its reliability.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for detecting video field motion between adjacent video field pairs of opposite parity, the method comprising:

receiving pixels from a first video field of a specified parity via a first pixel data read module;

receiving pixels from a second video field of an opposite parity to the specified parity via a second pixel data read module, the second video field being one of a preceding video field and a subsequent video field to the first video field;

combining the first video field and the second video field to form a pixel frame comprising the combined pixels from the first and second video fields using a motion measurement module component;

selecting, using the motion measurement module component, a set of pixels vertically adjacent to a specified video pixel position in the pixel frame, wherein the specified video pixel position corresponds to a position of a missing pixel in the first video field and wherein the selected set of pixels comprises a first subset of pixels from the first video field and a second subset of pixels from the second video field;

measuring signal values of the set of selected pixels using the motion measurement module component;

detecting a signal frequency of the Nyquist rate in a vertical direction based on the measured signal values of the set of selected pixels using the motion measurement module component; and determining a motion measurement corresponding to the specified video pixel position based on an amplitude of the detected signal frequency of the Nyquist rate, wherein determining the motion measurement comprises determining a positive value according to at least one of the following:

$D_1 = \min(S_1) - \max(S_2);$ $D_2 = \min(S_2) - \max(S_1),$ wherein $S_1$ comprises the first subset of pixels from the first video field and $S_2$ comprises the second subset of pixels from the second video field.

2. The method of claim 1, wherein detecting a signal frequency of the Nyquist rate in the vertical direction comprises detecting groups of adjacent scan lines exhibiting an alternating bright-dark pattern and measuring an amplitude of the alternating bright-dark pattern between the set of selected pixels vertically adjacent to the specified pixel position.

3. The method of claim 1, wherein when a positive value is not determined, the motion measurement corresponding to the specified video pixel position is zero.

4. The method of claim 1, further comprising using a false detection probability indicator for measuring the probability that a normalized detected motion measurement is larger than zero for vertical spatial frequencies lower than the Nyquist frequency but higher than a false detection threshold frequency.

5. The method of claim 4, wherein a lower false detection probability and a higher false detection threshold frequency are achieved if a number of selected pixels in the set of vertically adjacent pixels in the pixel frame is larger.

6. The method of claim 4, wherein the input pixels designated for motion detection are not switched when the current field is alternating between even and odd fields.

7. The method of claim 1 wherein the second video field immediately precedes the first video field and wherein the method further comprising:

receiving pixels from a third video field of an opposite parity to the specified parity, the third video field being an immediately subsequent video field to the first video field and having the same parity as the second video field;

selecting a second pixel in the second video field and a third pixel in the third video field, the second and third pixels positioned temporally adjacent to the position of the missing pixel in the first video field;

measuring signal values of the first and second pixels; and determining a second motion measurement corresponding to the specified video pixel position based on an absolute value of a difference between the first and second pixel signal values.

8. The method of claim 7 further comprising:

selecting a second set of pixels vertically adjacent to the specified video pixel position in the pixel frame, wherein the selected first set of pixels and the selected second set of pixels are vertically symmetrical with respect to the specified video pixel position in the pixel frame;

measuring signal values of the second set of selected pixels;

detecting a second signal frequency of the Nyquist rate in a vertical direction based on the measured signal values of the second set of selected pixels; and determining a third motion measurement corresponding to the specified video pixel position based on an amplitude of the detected second signal frequency of the Nyquist rate, wherein the selected first set of pixels, the selected second set of pixels, and the selected second and third pixels form a vertically symmetrical temporal-vertical footprint with respect to the position of the missing pixel in the first video field.

9. The method of claim 7 further comprising:

combining the first video field and the third video field to form a second pixel frame comprising the combined pixels from the first and third video fields;

selecting a second set of pixels vertically adjacent to a specified video pixel position in the second pixel frame, wherein the specified video pixel position corresponds to the position of the missing pixel in the first video field;

measuring signal values of the second set of selected pixels;

detecting a second signal frequency of the Nyquist rate in a vertical direction based on the measured signal values of the second set of selected pixels; and determining a third motion measurement corresponding to the specified video pixel position based on an amplitude of the detected second signal frequency of the Nyquist rate.

10. The method of claim 9 further comprising:

selecting a third set of pixels vertically adjacent to the specified video pixel position in the pixel frame, wherein the selected first set of pixels and the selected third set of pixels are vertically symmetrical with respect to the specified video pixel position in the pixel frame;

selecting a fourth set of pixels vertically adjacent to the specified video pixel position in the second pixel frame, wherein the selected second set of pixels and the selected fourth set of pixels are vertically symmetrical with respect to the specified video pixel position in the second pixel frame;

measuring signal values of the third and fourth sets of selected pixels;

detecting third and fourth signal frequency of the Nyquist rate in a vertical direction based on the measured signal values of the third and fourth sets, respectively, of selected pixels; and determining fourth and fifth motion measurements corresponding to the specified video pixel position based on amplitudes of the detected third and fourth signal frequency of the Nyquist rate, wherein the selected first, second, third and fourth set of pixels, and the selected second and third pixels form a vertically symmetrical and temporally symmetrical footprint with respect to the position of the missing pixel in the first video field.

11. A system for detecting motion between video fields of same and opposite parity from an interlaced video source, the system comprising:

an external memory;

a memory controller configured for receiving pixels from a plurality of video fields;

a plurality of line buffers;

a plurality of pixel data read modules, a motion measurement module configured to:

receive pixels from a first video field of a specified parity via a first pixel data read module;

receive pixels from a second video field of an opposite parity to the specified parity via a second pixel data read module, the second video field being one of a preceding video field and a subsequent video field to the first video field;

combine the first video field and the second video field to form a pixel frame comprising the combined pixels from the first and second video fields;

select a set of pixels vertically adjacent to a specified video pixel position in the pixel frame, wherein the specified video pixel position corresponds to a position of a missing pixel in the first video field and wherein the selected set of pixels comprises a first subset of pixels from the first video field and a second subset of pixels from the second video field;

measure signal values of the set of selected pixels;

detect a signal frequency of the Nyquist rate in a vertical direction based on the measured signal values of the set of selected pixels; and determine a motion measurement corresponding to the specified video pixel position based on an amplitude of the detected signal frequency of the Nyquist rate by determining a positive value according to at least one of the following:

$$D_1 = \min(S_1) - \max(S_2);$$

$$D_2 = \min(S_2) - \max(S_1),$$

wherein $S_1$ comprises the first subset of pixels from the first video field and $S_2$ comprises the second subset of pixels from the second video field.

12. The system of claim 11, wherein the motion measurement module comprises a plurality of minimum value registers for storing minimum pixel values of input pixel signals.

13. The system of claim 12, wherein the motion measurement module further comprises a plurality of maximum value registers for storing maximum pixel values of input pixel signals.

14. The system of claim 13, wherein the motion measurement module further comprises a plurality differencing registers for comparing the maximum and minimum pixel values from pixels signals presented to motion measurement module.

15. The system of claim 14, wherein the motion measurement module further comprises a plurality multiplexers for selecting the motion signal outputs of pixels for a specified pixel position.

* * * * *

UNITED STATES PATENT AND TRADEMARK OFFICE
CERTIFICATE OF CORRECTION

PATENT NO. : 7,616,693 B2  Page 1 of 1
APPLICATION NO. : 11/001826
DATED : November 10, 2009
INVENTOR(S) : Chou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1370 days.

Signed and Sealed this

Nineteenth Day of October, 2010

David J. Kappos
*Director of the United States Patent and Trademark Office*